Patented Oct. 13, 1942

2,298,493

UNITED STATES PATENT OFFICE 2,298,493

PROCESS FOR PRODUCING ANHYDROUS MAGNESIUM SULPHATE

Walter H. MacIntire, Knoxville, Tenn., assignor to American Zinc, Lead & Smelting Company, St. Louis, Mo., a corporation of Maine No Drawing. Application February 23, 1940, Serial No. 320,514

3 Claims. (Cl. 23—128)

This invention pertains to a novel process for producing anhydrous magnesium sulphate from serpentine or other similar natural silicates by treating the same with suitable amounts of concentrated sulphuric acid.

The primary object of the invention is the provision of a process whereby commercial anhydrous magnesium sulphate suitable as a conditioning material for fertilizers, etc., may be produced cheaply in a one-step procedure to give an immediate product which may be packaged as it comes from the mixing vats and which product does not require drying, calcining or grinding.

Another object is to procure a product which is substantially moisture-free and substantially free from chemically combined water and which has a much higher magnesium sulphate content than the usual imported "manure salt" by a simple process which requires only conventional equipment and facilities.

Other and further objects of the invention will be apparent from the following specification.

In the conventional process for producing magnesium sulphate a mixture of serpentine and dilute sulphuric acid are reacted together with the application of heat and time allowance. The resultant slurry is then filtered and the filtrate is evaporated to concentration that induces separation of Epsom salt which is then calcined to eliminate the water of crystallization and produce the anhydrous magnesium sulphate.

The present process differs from conventional practice in that dense sulphuric acid of approximately 77% concentration is used, without any dilution whatsoever, to produce the novel and valuable results observed.

Investigation of the idea that anhydrous magnesium sulphate might be recovered from serpentine, or other natural silicates, by subjecting the serpentine to dissolution by concentrated sulphuric acid revealed that pulverized serpentine when mixed with a 50% sulphuric acid underwent only partial dissolution; and that there was small variance in the amounts of dissolution for ranges from 50% to 30% of sulphuric acid. When the serpentine was digested with a 25% sulphuric acid for one and a half hours a sharp decrease in the dissolving power of the sulphuric acid was noted.

It was found, however, that when undiluted sulphuric acid of 77% concentration was used there resulted a powerful and rapid reaction accompanied by high temperature and the serpentine was subjected to substantially complete dissolution.

The reaction was substantially complete with such attendant heat and drying of the mass as to give a maximal concentration of substantially water-free magnesium sulphate. The product produced was a self-dried crude magnesium sulphate of the desired commercial quality.

The new process is preferably carried out by placing pulverized serpentine in a suitable mixing vat of conventional form, for example, a mixing apparatus such as is used in the acidulation of rock phosphate. To the mixing vat is added undiluted sulphuric acid of approximately 77% concentration and 60° Baumé in an amount equivalent to the Mg/Ca content of the serpentine; and the resultant slurry is subjected to continuous stirring. The slurry of serpentine and sulphuric acid first undergoes a period of ebulition or effervescence. Following this effect the slurry evolves into a thick doughy mass, and then passes into a hot mass. This hot mass is subjected to continuous stirring, and drying action which is induced by the excessive heat produced from the reaction, and eventually undergoes complete granulation as a result thereof. Approximately 55% of the resultant granulated product comprises magnesium sulphate and is not only substantially free of moisture, but is also substantially free from chemically combined water. It has a much higher magnesium sulphate content than ordinary imported "manure salt." It moreover has a concentration equal to about 64% of that of imported calcined Kieserite fertilizer. It has been determined that 100 lbs. of this anhydrous magnesium sulphate product will furnish magnesium sulphate equivalent to that contained in 112 lbs. of Epsom salt.

By utilizing undiluted sulphuric acid of approximately 77% concentration in an amount equivalent to the Mg/Ca content of the silicate the anhydrous magnesium sulphate is evolved in a single step directly, cheaply and efficiency, and a higher percentage of anhydrous magnesium sulphate is produced than heretofore. The process gives a dry, granulated product which can be removed from the mixing vats and placed in bags or containers, ready for use, without any of the further conventional steps of drying, calcining or grinding. The process is economical and simple, as minimal equipment and facilities will suffice and a good grade of commercial anhydrous magnesium sulphate is produced.

It has been found that, if desired, the mixture of serpentine and concentrated sulphuric acid can be leached free of engendered magnesium sulphate and that the leachings can then be evaporated to provide a crystallized Epsom salt ($MgSO_4.7H_2O$).

Ordinarily serpentine does not contain Ca in any appreciable amounts and the literature on this subject so states. For example: The composition of serpentine is set forth on page 544 of "Elements of Minerology, Crystollography and Blowpipe Analysis." Moses and Parsons, 5th edition, Van Nostrand, New York city. This composition is said to be $H_4Mg_3Si_2O_9$, with replacement by Fe. Another definition occurs in "Minerology" by Phillips, published by MacMillan in New York. On page 498 the author states that the composition of serpentine is $H_4Mg_3Si_2O_9$ or $H_3Mg_2(Mg.OH)(SiO_4)_2$. In addition, it is said that "serpentine is formed when magnesium silicates yield associated bases such as Ca and Fe to percolating water containing carbon dioxide."

If the serpentine contains no impurities such as Ca, the process is performed in exactly the same manner and the acid is based upon the amount of Mg present.

What is claimed is:

1. A process for producing magnesium sulphate consisting in comminuting serpentine containing calcium compounds, mixing said serpentine with sulfuric acid of 77% concentration in an amount equivalent to the Mg and Ca content of the serpentine and continuously stirring the mixture of serpentine and acid until the stirring and the heat of the reaction produce a dry granulated reaction product containing anhydrous magnesium sulphate as a major portion thereof.

2. A process for producing magnesium sulphate consisting in comminuting a mineral magnesium silicate containing calcium compounds, mixing said mineral magnesium silicate with sulfuric acid of 77% concentration in an amount equivalent to the Mg and Ca content of the silicate and continuously stirring the mixture of silicate and acid until the stirring and the heat of the reaction produce a dry granulated product containing anhydrous magnesium sulphate as a major portion.

3. A process for producing magnesium sulphate consisting in comminuting serpentine, mixing said serpentine with sulphuric acid of 77% concentration in an amount equivalent to the Mg content of the serpentine and continuously stirring the mixture of serpentine and acid until the stirring and the heat of the reaction produce a dry granulated reaction product containing anhydrous magnesium sulphate as a major portion thereof.

WALTER H. MacINTIRE.